Patented Dec. 15, 1936

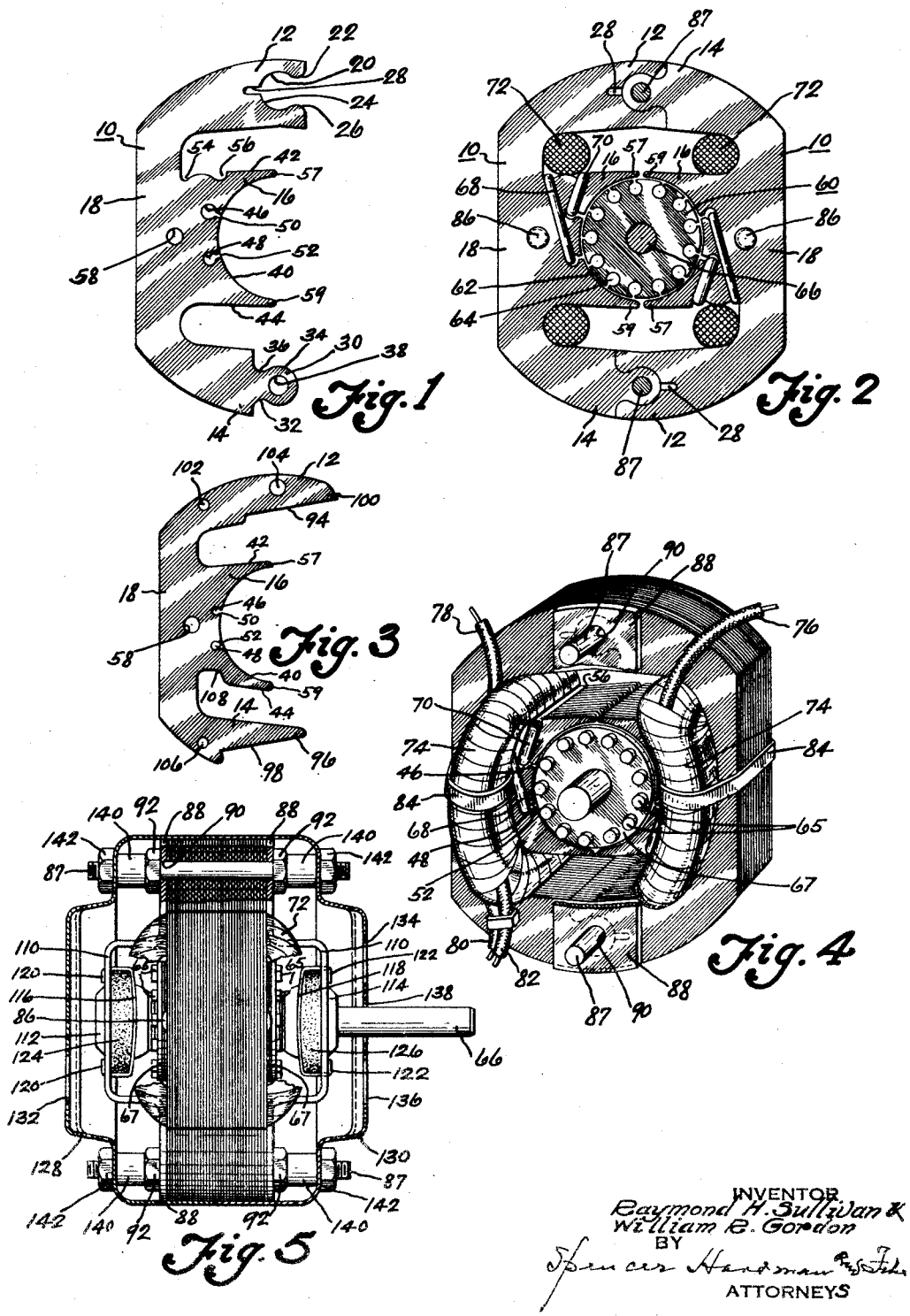

2,064,090

UNITED STATES PATENT OFFICE 2,064,090

MOTOR

Raymond H. Sullivan and William R. Gordon, Rochester, N. Y., assignors to General Motors Corporation, Detroit, Mich., a corporation of Delaware Application May 23, 1934, Serial No. 727,072

3 Claims. (Cl. 171—252)

This invention relates to motors, and more particularly to the stator structure of motors and dynamo electric machines.

An object of this invention is to provide a motor stator structure that is easy to manufacture, and that has good magnetic efficiency.

Another object of this invention is to provide a stator structure for dynamo electric machines, in which structure the joints in the magnetic circuit have low reluctance and interlock so that they aid in securing parts of the magnetic circuit together.

In the disclosed embodiment of this invention, these objects are accomplished by incorporating in a motor stator laminations having projecting portions that are smoothly curved so that sharp corners are minimized to avoid sharp corners and points on the punching dies which would wear or become damaged easily; said projecting portions being substantially symmetrical with respect to a center line and having a narrow section adjacent the lamination, so that other laminations having openings therein complementary to the projecting portions fit the projecting portions to establish a good magnetic joint and grip the projecting portion and the neck thereof to maintain close engagement of the laminations. Also, it is desirable to provide slots in the laminations adjoining the openings therein, which slots so impart the ability to give to the said laminations that altho the fit between the projecting portions and openings is tight, the laminations will not warp or be detrimentally deformed.

Further objects and advantages of the present invention will be apparent from the following description, reference being had to the accompanying drawing wherein a preferred embodiment of one form of the present invention is clearly shown.

In the drawing:

Fig. 1 is a plan view of a preferred form of lamination utilized in the present invention.

Fig. 2 is a plan view of a stator with parts thereof shown in section, and embodying laminations such as those shown in Fig. 1.

Fig. 3 is a plan view of a modified form of lamination that is adapted to be used in a stator such as that shown in Fig. 2.

Fig. 4 is a perspective view of a stator utilizing laminations such as those shown in Fig. 1, and shows the windings assembled on the stator.

Fig. 5 is a sectional view of a motor assembly embodying a stator such as that shown in Fig. 4.

With particular reference to Fig. 1, a substantially E-shaped lamination 10 has outer legs 12 and 14 and a central leg or pole piece 16 extending in substantially parallel relation from a connecting portion 18. The leg 12 has a recess or opening 20 therein that opens toward the end thereof and preferably has curved surfaces 22, 24 and 26, which curved surfaces are preferably circular, and said curved surfaces preferably adjoin each other so that the opening or recess has a restricted portion at or near the end of the leg. A recess or slot 28 is also preferably provided in the leg 12 adjoining the recess 20 and facing the open end thereof. The outer leg 14 has a projecting portion 30 at the end thereof, which projecting portion preferably has outer curved portions 32, 34 and 36 that substantially match and are complementary to the curves 22, 24 and 26 respectively, of the recess 20. The projecting portion 34 has an opening 38 therein that is preferably concentric with the curved portion 30.

The central leg or pole piece 16 has an arcuate end surface 40 and preferably has substantially straight and parallel sides 42 and 44. The pole piece 16 also has openings 46 and 48 near the arcuate surface 40, and slots 50 and 52 extend from the openings 46 and 48, respectively, to the arcuate surface 40. Notches 54 and 56 are provided in the side 42 of the pole piece. The lamination also has a hole 58 therein that is preferably near the mid portion of the connecting portion 18.

With particular reference to Figs. 2 and 4, parts bearing reference numerals similar to those previously used are similar. It may be seen from these views, that laminations such as those just described, and shown in Fig. 1, when one of them is reversed, fit together so that the projecting portions 30 on each of the laminations fit into the recesses 20 on the other lamination to provide an interlocking joint between the outer legs of the laminations. This non-linear joint provides a low reluctance magnetic path between the laminations. The slot 28 permits the leg 12 to give somewhat, and provides the leg with sufficient resilience so that a tight joint is obtained between the laminations without distorting or buckling of the leg 12. When the laminations are thus locked together, the pole pieces 16 on the laminations extend toward each other so that their tips 57 and 59 are in close proximity to each other, and the arcuate surfaces 40 define a substantially circular opening, within which opening a rotor 60 is rotatably mounted.

The rotor 60 is made up of a stack of laminations, preferably such as those shown at 62 in Fig.

2, having openings such as 64 for the accommodation of rotor conductor bars such as 65, which conductor bars are short circuited by end rings 67. The laminations 62 are preferably pressed onto a shaft 66. Shading coils 68 and 70 encircle different portions of the pole pieces 16. One side of each of the shading coils 70 is disposed in one of the notches 56, and the opposite of those coils extend through the openings 46. One side of each of the shading coils 68 is disposed in one of the notches 54, and the opposite sides of those coils extend through the openings 48. The notches 54 and 56, and the openings 46 and 48 thus locate the shading coils and hold them in position. The planes defined by the sides of the shading coils are preferably non-parallel. Field coils 72 are mounted on, and encircle each of the pole pieces, and are preferably located adjacent the connecting portions 18 of the laminations. These coils are preferably prewound and wrapped with insulating tape as indicated at 74 in Fig. 4. Leads such as 76, 78, 80 and 82 are provided for making connections to the field coils. The coils are held in position by clamping strips 84 that hook over the sides of the coil and extend across the portions 18 of the laminations.

In the assembly of this stator, laminations such as those shown in Fig. 1 are stacked together and fastened by a rivet or other suitable fastening means 86 that extends through the openings 58 in the laminations. These stacks each comprise half of the core. The shading coils 68 and 70 are then mounted on pole pieces. The field coil 74 is slipped into position over the end of the pole piece and clamped by the strip 84. When the halves of the stator are thus assembled, two such halves are pressed together as indicated in Fig. 2. Bolts or other suitable fastening means 87 are placed in the holes 38, and clamping members 88 having holes 90 through which the bolts 87 pass, are secured in position on each side of the core by nuts 92, as shown in Fig. 5. This clamps the laminations of the core tightly together, and in addition to the inter-locking joint between the halves of the core, prevents separation of the halves.

With particular reference to Fig. 3, the reference numerals similar to those previously used refer to similar parts which perform similar functions. With this form of lamination, the laminations that comprise the halves of the core are similar, but the joint provided between the halves, although non-linear, is not inter-locking. In fact, in this form, the outer leg 12 has a cutaway portion 94 for accommodating a projecting portion 96 of the leg 14; while the leg 14 has a cutaway portion 98 for accommodating a projecting portion 100 of the leg 12. Holes 102, 104 and 106 are provided for the accommodation of clamping rivets or other suitable fastening means, not shown, which rivets preferably secure clamping plates, not shown, across the ends of the core to hold the two halves of the core together. In this form, also a single notch 108 is provided for the accommodation of the sides of both of the shading coils.

With particular reference to Fig. 5, reference numerals similar to those previously used also refer to similar parts that perform similar functions. In this view, it may be seen that the clamping members 88 preferably extend across the ends of the stator and have offset portions 110 at the midportion thereof, so that these members provide supports for journal bearings 112 and 114. The bearings 112 and 114 are preferably of the self-aligning type and are held in place by retaining members 116 and 118 respectively, which retaining members preferably have tips 120 and 122 respectively that extend thru openings in the offset portion 110, and are bent over to provide a clamping means. Rings of felt or other suitable lubricant retaining material 124 and 126 respectively, surround the bearings 112 and 114 to retain a supply of lubricant for those bearings. Substantially cup-shaped housing members 128 and 130, having ventilating openings such as 132, 134 and 136 therein, fit over the stator and cover the ends thereof. The cover 130 has a central opening 138 therein through which the shaft 66 projects. Spacing collars 140 are provided on each end of the bolts 86, which bolts extend through openings in the housing members, so that the housing members are secured in position by nuts 142 on those bolts.

From the foregoing description of the construction and features of the present motor stator, it will be apparent that the stator includes a core comprising sets of laminations 10 stacked together, one of said sets of laminations 10 having smoothly curved (as at 32, 34 and 36) projecting portions 30, said projecting portions 30 having thin necks provided by recesses (at 32 and 36) on opposite sides thereof, the second of said sets of laminations 10 having openings 20 therein that fit over the projecting portions 30 to provide low reluctance magnetic joints between the laminations 10, said second set of laminations 10 having tips at 22 and 26 that conform to said thin neck at 32 and 36 to provide gripping engagement between the laminations 10. Slots 28 are preferably provided, which slots 28 adjoin the openings 20 in the laminations 10.

This combination of elements possesses the following advantages:

1. A magnetic joint is provided that not only permits preassembly of the halves of the core, but also that interlocks to hold the halves of the core in close engagement.

2. Laminations are provided having smoothly curved joining portions which minimize sharp corners or points on the stamping dies for punching the laminations, so that longer life and better wearing qualities are obtained from the dies.

3. Laminations are provided which, as well as having interlocking magnetic joints, can all be punched with the same die.

4. An interlocking joint for magnetic cores is provided, one part of which yields to prevent warping or detrimental distortion of the laminations, altho tight gripping is obtained at the joint.

While the form of embodiment of the present invention as herein disclosed, constitutes a preferred form, it is to be understood that other forms might be adopted, all coming within the scope of the claims which follow.

What is claimed is as follows:

1. In a motor stator, a core comprising, in combination, laminations stocked together and comprising portions of the core, one of said laminations having a substantially arcuate projecting portion at one end thereof which arcuate portion extends more than 180°, another of said laminations having an opening therein that fits over the projecting portion to hold the laminations together and to provide a low reluctance magnetic joint between said laminations.

2. In a motor stator, a core comprising, in combination, laminations stacked together and comprising portions of the core, one of said laminations having a smoothly curved projecting portion on an end thereof, said projecting portion having a thin neck provided by recesses on opposite sides thereof, another of said laminations having an opening therein that fits over the projecting portion to provide a low reluctance magnetic joint, portions of which latter mentioned lamination conform to said recesses to grip the said projecting portion at the neck to hold the laminations together.

3. In a motor stator, a core comprising, in combination, sets of laminations stacked together, one of said sets of laminations having smoothly curved projecting portions on the ends thereof, said projecting portions having thin necks provided by recesses on opposite sides thereof, the second of said sets of laminations having openings therein that fit over the projecting portions to provide low reluctance magnetic joints between the laminations, said second set of laminations having tips that conform to said thin neck to provide gripping engagement between the laminations, said second set of laminations having slots therein that adjoin and extend said openings.

RAYMOND H. SULLIVAN.
WILLIAM R. GORDON.